April 13, 1954  A. B. McCALL ET AL  2,675,093
GAS OR OIL TANK CAP
Filed Oct. 3, 1949
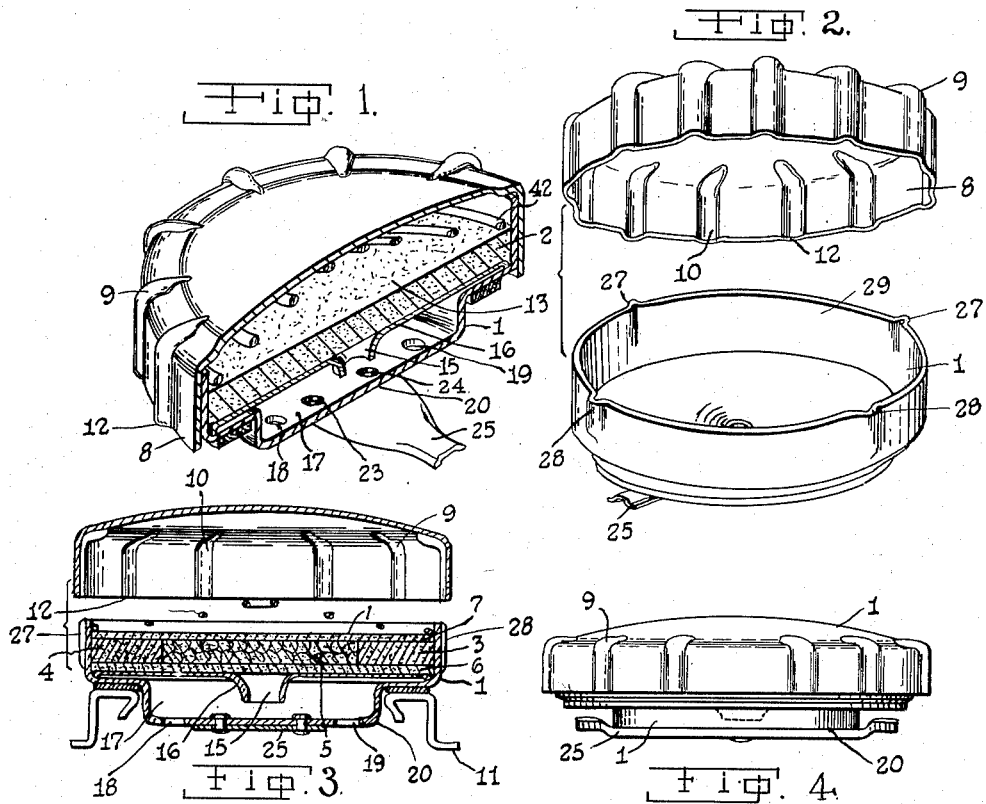
Arthur B. McCall.
Vertus C. Barnett.
INVENTORS.

Patented Apr. 13, 1954

2,675,093

UNITED STATES PATENT OFFICE 2,675,093

GAS OR OIL TANK CAP

Arthur B. McCall, Springfield, and Vertus C. Barnett, Greenview, Ill.

Application October 3, 1949, Serial No. 119,234

1 Claim. (Cl. 183—45)

Our invention has to do with fittings for containers such as fluid containers, and especially such fittings as closure caps and filtering attachments; an object being to provide means for filtering dust, dirt, bean fuzz, etc., from replacement air as it enters such container through the cap or filter fitting; to absorb some moisture from such air at the same time and prevent the loss of fluids and volatile gases from said container through the cap or fitting when the same is being bumped about in service.

A purpose of our invention is to provide a cap or fitting for containers of gasoline, oil and other fluids where the cap or fitting is equipped with preferably felt for filtering dust, dirt, grain fuzz and the like, out of the air entering the containers; to provide means for absorbing moisture from such air and to provide in such a cap or fitting such a novel and efficient combination of functioning parts as will greatly reduce the escape of such fluids from such container when the same is being bumped and jostled about roughly in service where, in the case of gasoline, for instance, it is at least hazardous and wasteful to bump gas out onto the gas tank where it will spoil paint and may catch fire.

A further purpose of our invention is to provide a fuel tank cap constructed to define a top cover member with a series of air intakes forming a group of comfortable and attractive hand grips, a bottom insert cup with relatively large vent holes in its base, a Venturi plate defining a back splash deflector directly over the base to break up the back splashing gas into a spray, with a central inverted collar on this plate to trap agitated gases and vapors and quickly return them to the fuel tank; while a filter felt member covering the Venturi plate also helps to retain the "light ends" or vapor elements of the gas when they try to escape and this filter felt member resting as it does on the Venturi plate and directly up under the top cover member, is held in a strategic position to thus serve its important double purpose, with a resulting better efficiency of the engine and valves.

We achieve our purposes by the fluid container cap and fitting described herein, defined in the claims and shown in their preferred novel and practical assembly in the drawings, wherein:

Figure 1 is a perspective of a vertical half-section through our cap, and showing die punched holes in the bottom of the cup chamber and showing a felt filter.

Figure 2 is a perspective of an exploded view of the top cover and bottom cup portion of our cap, showing their relative fitting relation.

Figure 3 is a vertical half-section of our cap in which figure we show punched or drilled, holes in the bottom of the vacuum chamber and this figure shows a felt and silica gel filter insert.

Fig. 4 is a side view of our cap.

It is obviously not an essential feature of importance in our invention whether it is secured to the container by threads, by spring clamp or by other means and we here respectfully make reference to a now pending application, Serial Number 729,791, filed February 20, 1947, and now Patent 2,603,308 dated July 15, 1952.

Thus, in our gas tank cap, we have a main cup member 1, into which we place a felt filtering insert 2 which catches the above mentioned dust, dirt and bean fuzz so it cannot enter the gas tank. A second insert 3 may be used when needed, by the farmer, and is made of a felt ring 4 filled with silica gel 5 and covered with felt caps 6 and 7 so as to more effectively absorb moisture entering the cap with the replacement air, which action is more needed in damp cold seasons and places than it is in hot dry harvest days.

A top cover 8 for cup 1 is shaped to define a series of spaced upright ribs 9, each of which, by its inner wall, forms an upright channel or air intake passage 10 through which the replacement air enters the gas tank cap.

Just one of these air intake passages if always open, would admit enough air to let the gas out of the tank 11 when running, but this series of passages 10 provides a greater chance for continued service in addition to the fact that, as designed, these upright ribs 9 define an attractive and very effective hand grip for holding the cap when turning it.

When dust, dirt, bean fuzz, etc., enter upright air intake passages 10 at their bottom end 12 it is deposited on top surface 13 of felt insert 2 in Fig. 2 or top surface of silica gel felt insert 3 in Fig. 3, as the air goes on down through these filtering inserts on its way to tank 11.

In the novel construction of our invention, after this replacement air passes through the felt filter 2 or 3, it then moves down through the funnel shaped or Venturi passage 15 in Venturi plate 16, then through vacuum chamber 17 and out into tank 11 through punched outlets 18 and 19 in bottom 20 of cup 1 (see Figure 1).

Rivets 23 and 24 hold clip 25 securely in place on the under side of bottom 20 of cup 1.

Thus, with this construction of our gas tank cap, it will be readily realized that we can usually prevent the escape of gas out through the gas cap for the following reason:

When the machine is in operation with the gasoline jostling about in tank 11, the back splash of the gas forces it up into chamber 17 through holes 18 and 19, thus, forcing the gas up where it is hard for it to pass up through Venturi hole 15, like going through a funnel backward and upward. This Venturi hole 15 is preferably about the capacity of both holes 18 and 19 and the back splash or "breather" action of the gas movement has, under severe tests, only been able to get a very little gasoline up through the top of the funnel center in Venturi plate 16 and when it does, it is stopped by the filtering felt above it only to quickly run back down into Venturi hole 15 and into chamber 17 and tank 11 again through holes 18 and 19.

We prefer a water-proof neoprene or other synthetic material not affected by gasoline for our cap gaskets, which can be made more effective by a little surfacing of Vaseline or the like.

Note, in Figure 2, that we prefer to provide about four opposed relatively small upright peripheral ribs 27 and 28 in the side wall 29 of cup 1 so that any two opposed upright channels or air passages 10 of ribs 9 may slip down over smaller ribs 27 and 28 as an effective means of holding top cover member 8 from turning on cup 1 when in place.

When hand grips or ribs 9 are used, then no knurling is needed on cover 8.

In the manufacture of our invention, it will be desired to press Venturi plate 16 down over chamber 17 to thus effectively form lower vacuum chamber 17 with this Venturi top plate adapted to effectively rebuff and break up the back splashing gas into a spray that is trapped and quickly returns back into the tank 11.

It will be apparent that when the pressure in tank 11 for any reason falls below that of atmosphere, air will be drawn through fluted portions 9, through filter 4, aperture 15 and perforations 18 and 19 to relieve this condition. In the event that pressure in tank 11 exceeds atmospheric gases will flow in reverse direction, and vapor particles in the gases will be filtered out and returned to the gasoline tank through aperture 15.

The operative efficiency of our gas cap has been repeatedly tested by farmers and manufacturers in field service and laboratories with most satisfactory results and, having thus described our invention, what we claim is:

A filtering cap assembly adapted for attachment to the inlet opening of a gasoline tank comprising a cup member so shaped to define a lower space of small diameters and an upper space of greater diameter, spaced breather holes in the bottom of said member, a baffle and condensation plate press-fitted in the upper portion of said member and having a Venturi shaped aperture with a downwardly extending flange therethrough, said plate forming the boundary between said lower and upper spaces, a cover cap adapted to fit telescopically about the upper rim of said cup member, ribs on said upper rim to hold the cap from turning when in place, fluted portions pressed outwardly from the side and top walls of said cover cap to form air passages from the atmosphere to the said upper space, and, a filtering member substantially filling said upper space and above said plate, a clip secured to the bottom of said cup, the portion of said cup forming the lower space being adapted to fit into the filling opening of a gasoline tank and to be received therein by said clip, whereby air entering or leaving said gasoline tank as a result of breathing action must pass through said cap assembly and filtering member.

References Cited in the file of this patent

UNITED STATES PATENTS

| Number | Name | Date |
|---|---|---|
| 995,314 | Abs | June 13, 1911 |
| 1,841,691 | Wilson | Jan. 19, 1932 |
| 2,117,369 | Shaw | May 17, 1938 |
| 2,220,328 | Grothe | Nov. 5, 1940 |
| 2,314,330 | Eshbaugh et al. | May 23, 1943 |
| 2,496,883 | McKalip | Feb. 7, 1950 |